US009827667B2

(12) United States Patent
Griffith et al.

(10) Patent No.: US 9,827,667 B2
(45) Date of Patent: Nov. 28, 2017

(54) PNEUMATIC EXOMUSCLE SYSTEM AND METHOD

(71) Applicant: Other Lab LLC, San Francisco, CA (US)

(72) Inventors: Saul Griffith, San Francisco, CA (US); Pete Lynn, Oakland, CA (US); Della Shea, San Francisco, CA (US); Kevin Albert, San Francisco, CA (US); Tim Swift, Clovis, CA (US)

(73) Assignee: OTHER LAB LLC, San Francisco, CA (US)

( * ) Notice: Subject to any disclaimer, the term of this patent is extended or adjusted under 35 U.S.C. 154(b) by 151 days.

(21) Appl. No.: 14/577,524

(22) Filed: Dec. 19, 2014

(65) Prior Publication Data

US 2015/0290794 A1    Oct. 15, 2015

Related U.S. Application Data

(60) Provisional application No. 61/918,577, filed on Dec. 19, 2013.

(51) Int. Cl.
| | |
|---|---|
| *A61H 1/02* | (2006.01) |
| *B25J 9/00* | (2006.01) |
| *F04B 43/00* | (2006.01) |
| *F04B 45/053* | (2006.01) |
| *F04B 45/04* | (2006.01) |
| *F04B 49/12* | (2006.01) |
| *F04B 49/22* | (2006.01) |
| *F04B 53/10* | (2006.01) |

(Continued)

(52) U.S. Cl.
CPC ............ *B25J 9/0006* (2013.01); *A61H 1/024* (2013.01); *A61H 1/0237* (2013.01); *A61H 1/0244* (2013.01); *A61H 1/0274* (2013.01); *A61H 1/0277* (2013.01); *A61H 1/0281* (2013.01); *B25J 9/142* (2013.01); *F04B 43/0045* (2013.01); *F04B 45/045* (2013.01); *F04B 45/0533* (2013.01); *F04B 49/12* (2013.01); *F04B 49/22* (2013.01); *F04B 53/10* (2013.01); *F04B 53/16* (2013.01)

(58) Field of Classification Search
CPC .... A61H 1/0237; A61H 1/024; A61H 1/0244; A61H 1/0255–1/0266; A61H 1/0274–1/0296; A61F 5/012; B25J 9/0006
See application file for complete search history.

(56) References Cited

U.S. PATENT DOCUMENTS

| | | |
|---|---|---|
| 3,823,711 A | 7/1974 | Hatton |
| 3,868,952 A | 3/1975 | Hatton |
| 3,982,531 A | 9/1976 | Shaffer |

(Continued)

*Primary Examiner* — Valerie L Woodward
(74) *Attorney, Agent, or Firm* — Davis Wright Tremaine LLP

(57) ABSTRACT

A pneumatic exomuscle system and methods for manufacturing and using same. The pneumatic exomuscle system includes a pneumatic module; a plurality of pneumatic actuators each operably coupled to the pneumatic module via at least one pneumatic line, a portion of the pneumatic actuators configured to be worn about respective body joints of a user; and a control module operably coupled to the pneumatic module, the control module configured to control the pneumatic module to selectively inflate portions of the pneumatic actuators.

15 Claims, 15 Drawing Sheets

(51) Int. Cl.
*F04B 53/16* (2006.01)
*B25J 9/14* (2006.01)

(56) References Cited

U.S. PATENT DOCUMENTS

| | | | | |
|---|---|---|---|---|
| 3,993,056 | A | | 11/1976 | Rabischong et al. |
| 4,274,399 | A | * | 6/1981 | Mummert ............ A61H 1/0288 128/DIG. 20 |
| 4,671,258 | A | * | 6/1987 | Barthlome ........... A61H 1/0288 128/DIG. 20 |
| 4,944,755 | A | | 7/1990 | Hennequin et al. |
| 5,033,457 | A | | 7/1991 | Bonutti |
| 5,483,838 | A | | 1/1996 | Holden |
| 7,479,121 | B2 | | 1/2009 | Branch |
| 2001/0029343 | A1 | * | 10/2001 | Seto ........................ A61F 2/54 600/587 |
| 2002/0026794 | A1 | * | 3/2002 | Shahinpoor ............... A61F 2/08 60/508 |
| 2006/0161220 | A1 | * | 7/2006 | Kobayashi ............ A61F 5/0102 607/49 |
| 2010/0249675 | A1 | * | 9/2010 | Fujimoto ............. A61H 1/0285 601/40 |
| 2010/0280424 | A1 | | 11/2010 | Kawakami et al. |
| 2011/0118635 | A1 | | 5/2011 | Yamamoto |
| 2015/0088043 | A1 | * | 3/2015 | Goldfield ................. A61F 5/01 602/6 |
| 2015/0173993 | A1 | * | 6/2015 | Walsh .................... A61H 1/024 414/4 |

* cited by examiner

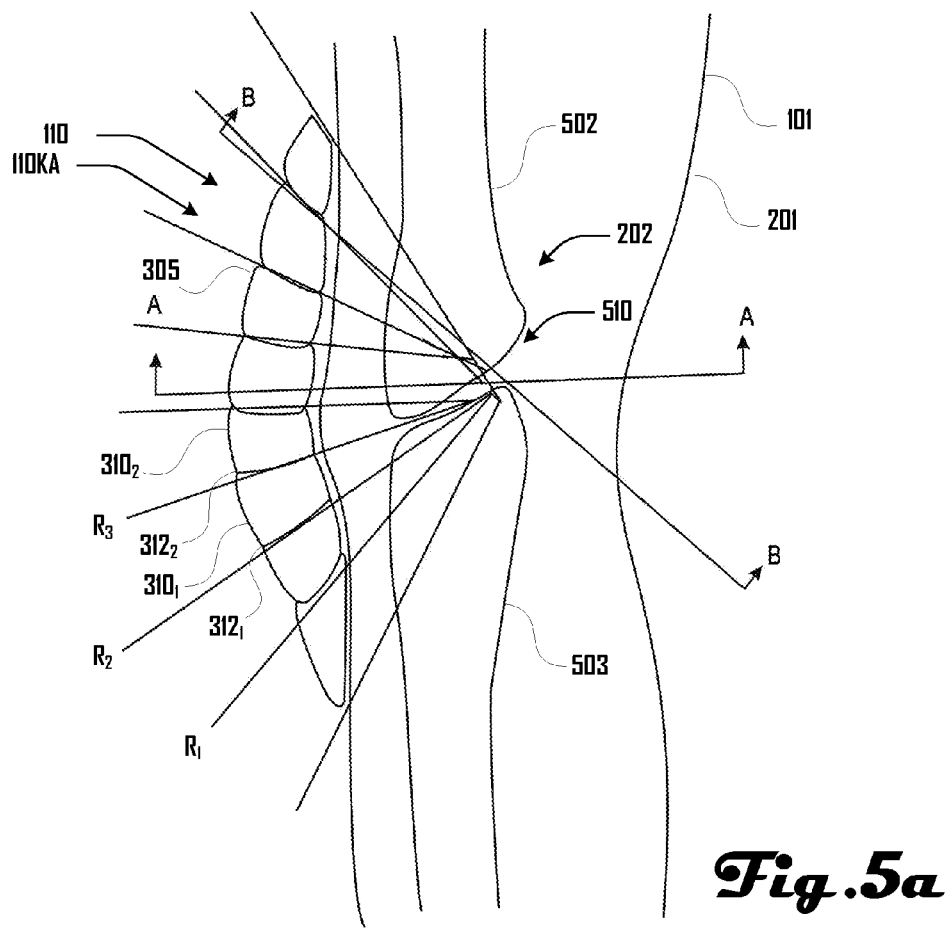
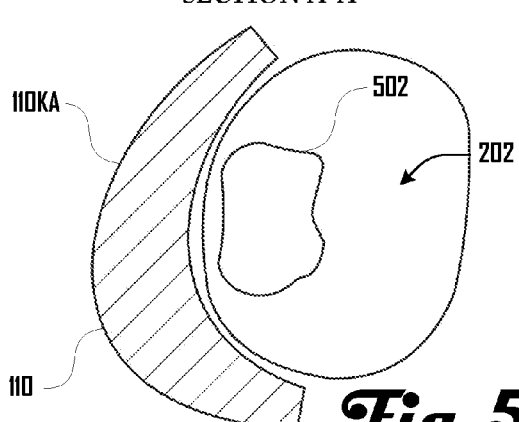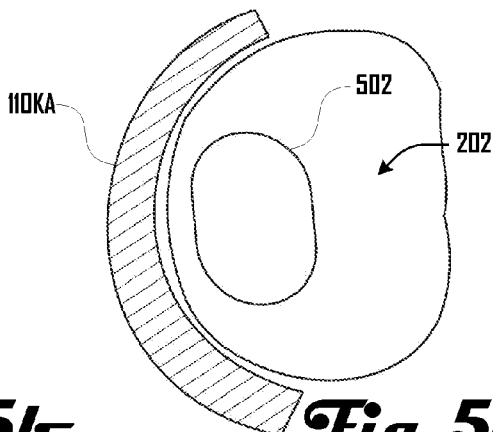
Fig. 5a
SECTION A-A
Fig. 5b
SECTION B-B
Fig. 5c

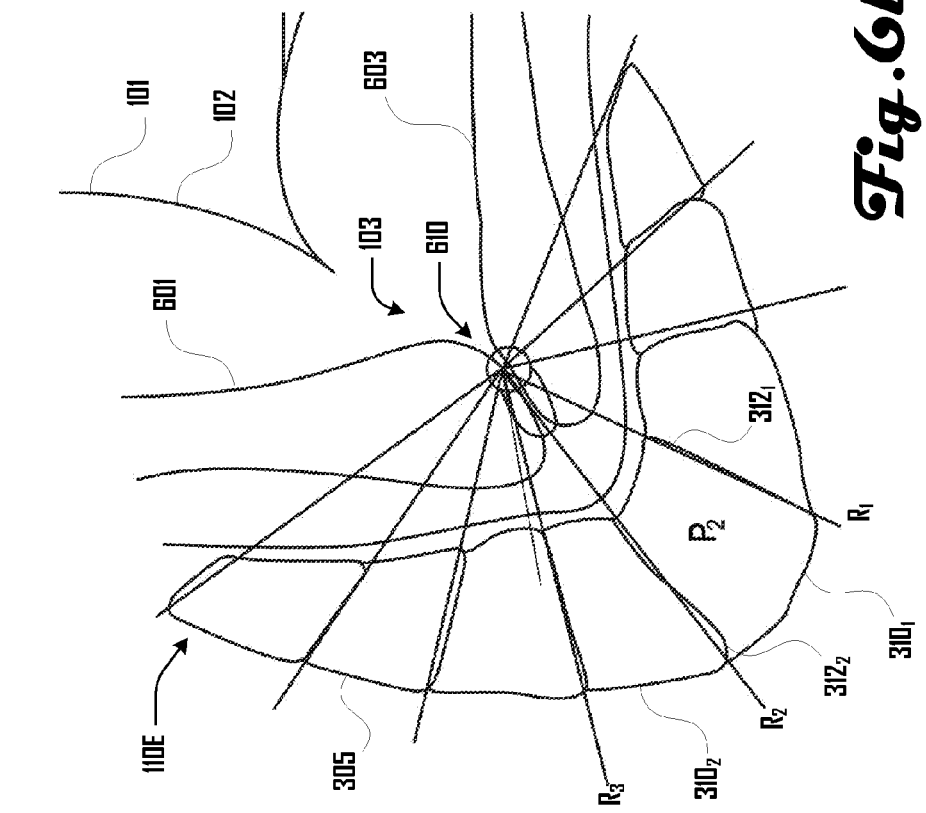
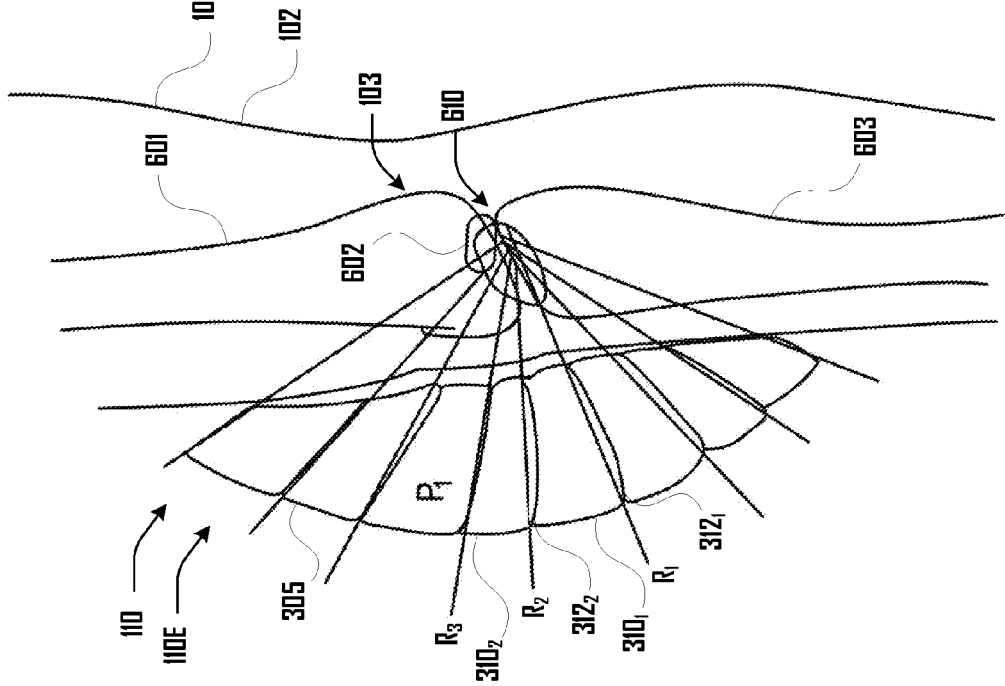

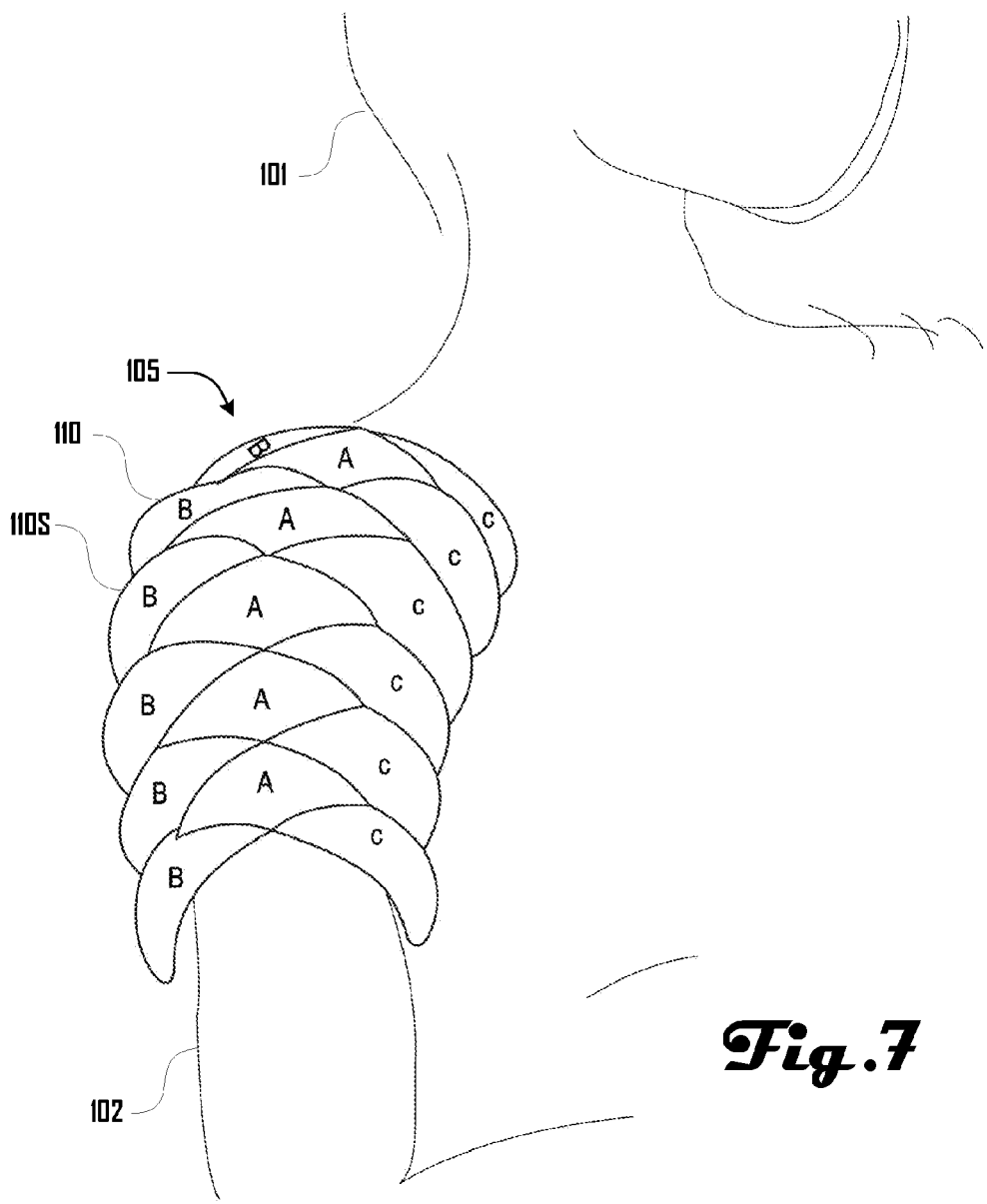

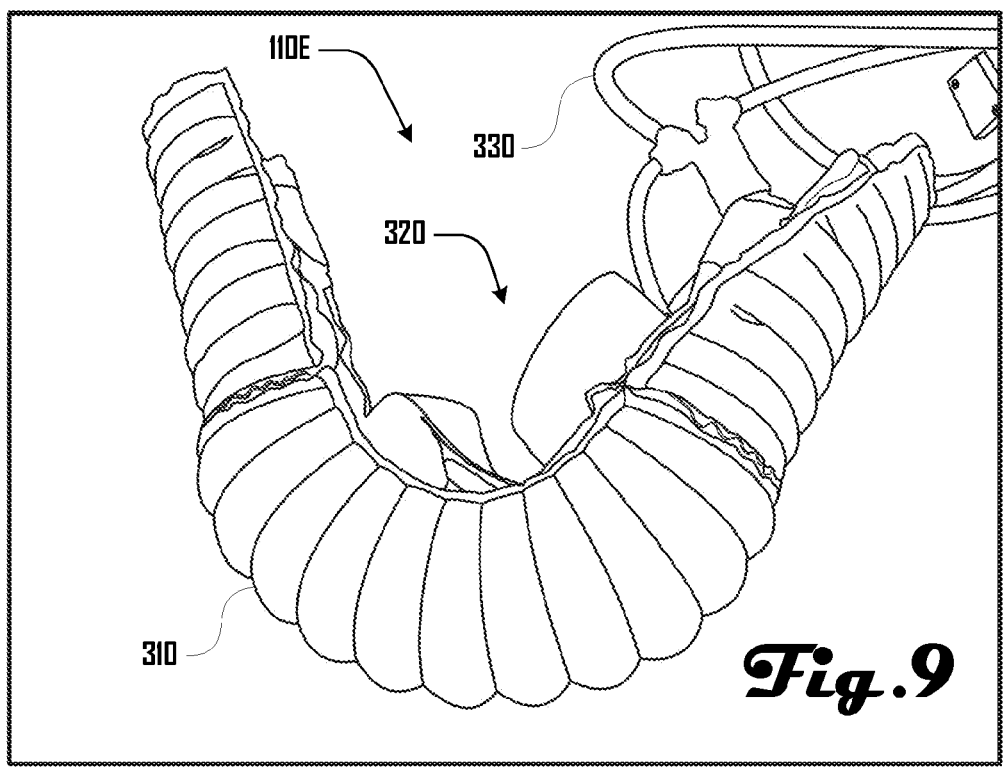

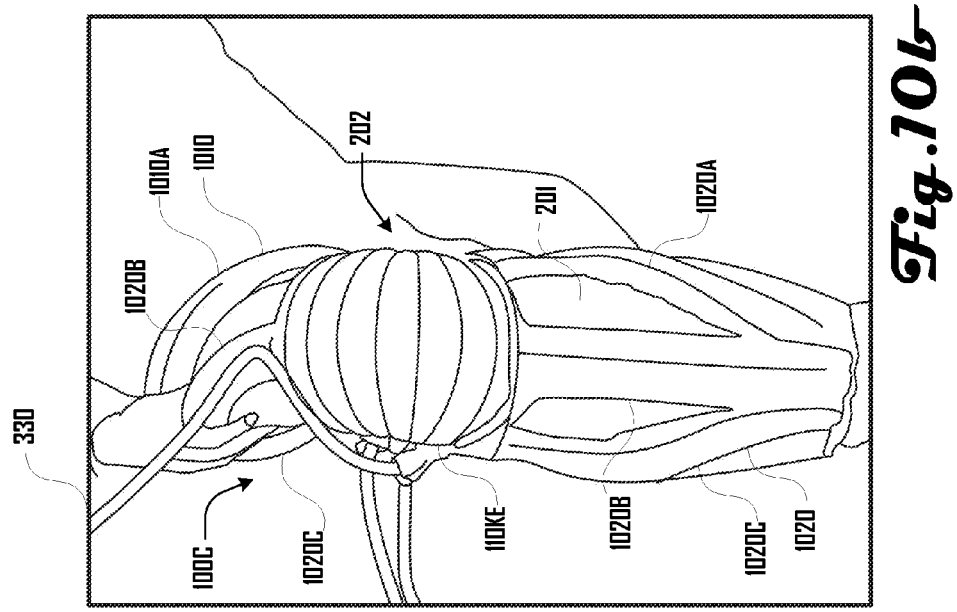
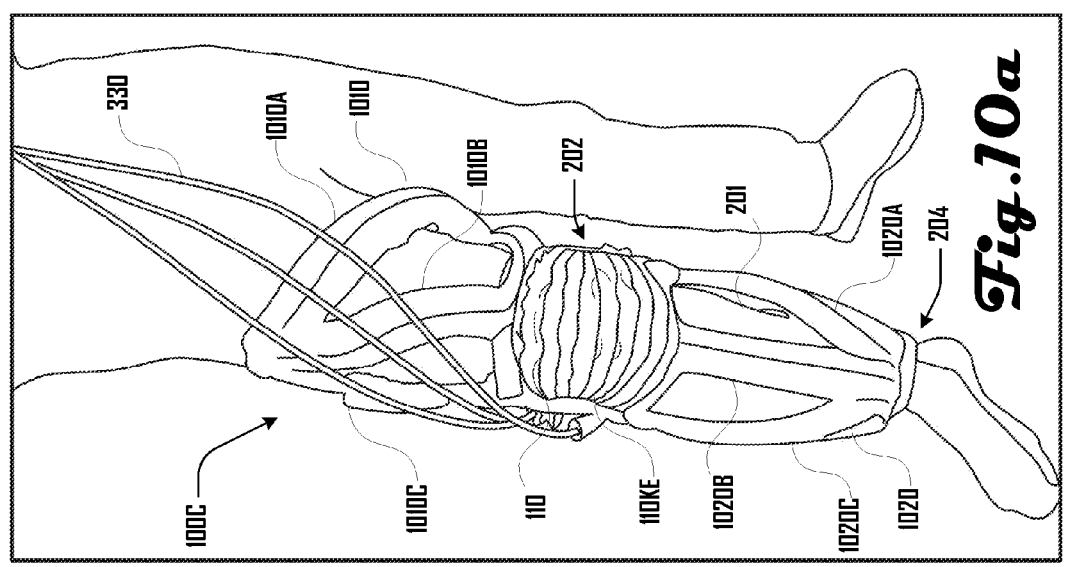

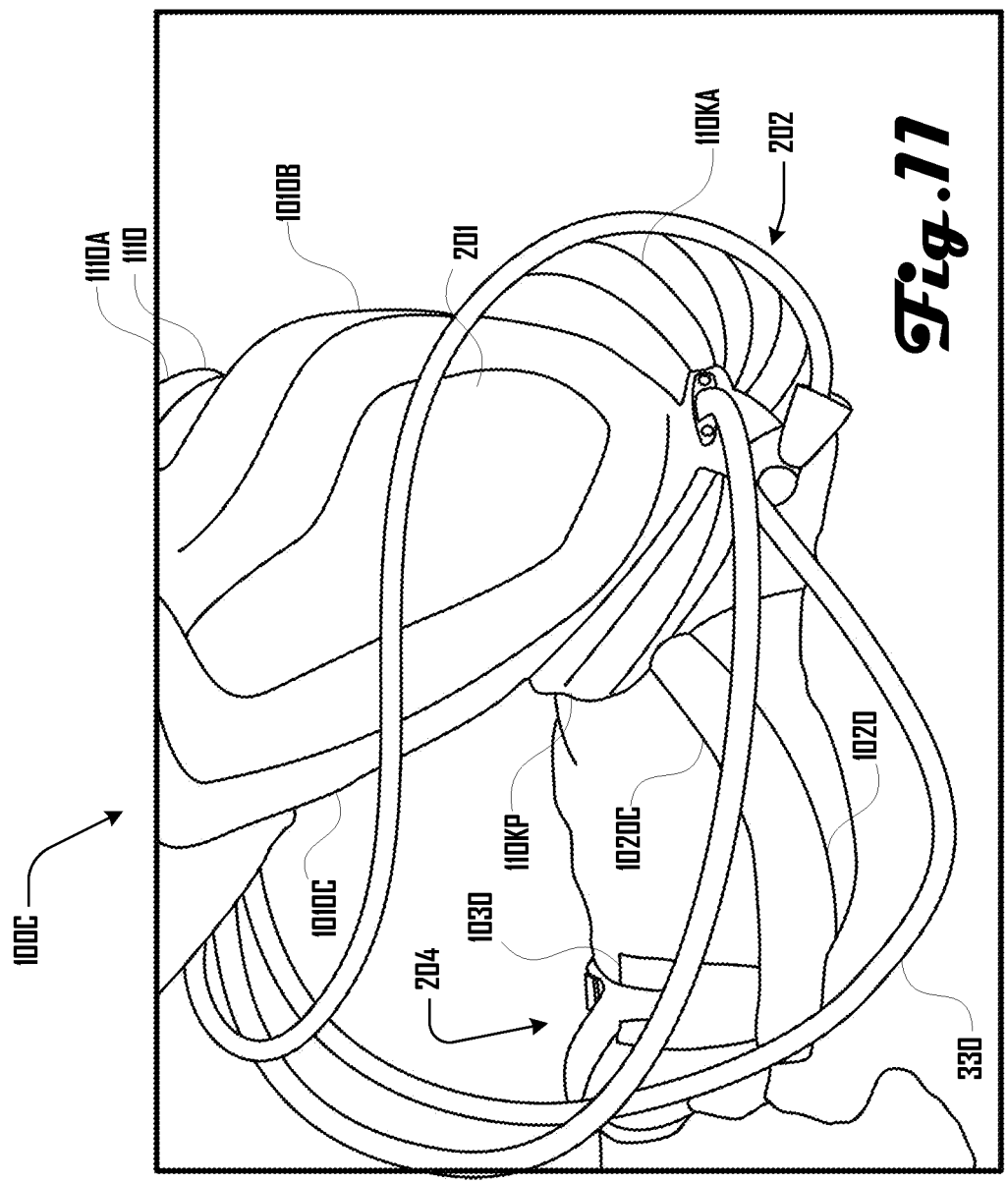

PNEUMATIC EXOMUSCLE SYSTEM AND METHOD

CROSS-REFERENCE TO RELATED APPLICATIONS

This application is a non-provisional of, and claims the benefit of, U.S. Provisional Application No. 61/918,577, filed Dec. 19, 2013. This application is also related to U.S. Non-Provisional application Ser. No. 14/577,817 filed Dec. 19, 2014, which claims the benefit of U.S. Provisional Application No. 61/918,578, filed Dec. 19, 2013. Each of these applications is hereby incorporated herein by reference in their entirety for all purposes.

GOVERNMENT LICENSING RIGHTS

This invention was made with government support under Contract Number W911QX12C0096 awarded by DARPA under the Maximum Mobility and Manipulation program. The government has certain rights in the invention.

BACKGROUND

Systems such as powered exoskeletons include a rigid architecture that is worn over the body of a user, which is actuated to induce or support movement of the user. For example, persons with spinal injuries who cannot control portions of their body are able to enjoy movement with such powered exoskeletons. Additionally, able-bodied persons are able to augment their abilities with the use of powered exoskeletons, including increasing walking, running or working endurance and increasing their capacity to lift or otherwise manipulate heavy objects.

However, powered exoskeletons have numerous drawbacks. For example, such systems are extremely heavy because the rigid portions of the exoskeleton are conventionally made of metal and electromotor actuators for each joint are also heavy in addition to the battery pack used to power the actuators. Accordingly, such exoskeletons are inefficient because they must be powered to overcome their own substantial weight in addition the weight of the user and any load that the user may be carrying.

Additionally, conventional exoskeletons are bulky and cumbersome. The rigid metal architecture of the system must extend the length of each body limb that will be powered, and this architecture is congenitally large because it needs to sufficiently strong to support the body, actuators and other parts of the system in addition to loads carried by the user. Portably battery packs must also be large to provide sufficient power for a suitable user period. Moreover, electromotor actuators are conventionally large as well. Unfortunately, because of their large size, conventional exoskeletons cannot be worn under a user's normal clothing and are not comfortable to be worn while not being actively used. Accordingly, users must don the exoskeleton each time it is being used and then remove it after each use. Unfortunately, donning and removing an exoskeleton is typically a cumbersome and time-consuming process. Conventional exoskeletons are therefore not desirable for short and frequent uses.

Additionally, because of their rigid nature, conventional exoskeletons are not comfortable and ergonomic for users and do not provide for complex movements. For example, given their rigid structure, conventional exoskeletons do not provide for the complex translational and rotational movements of the human body, and only provide for basic hinge-like movements. The movements possible with conventional exoskeletons is therefore limited. Moreover, conventional exoskeletons typically do not share the same rotational and translational axes of the human body, which generates discomfort for users and can lead to joint damage where exoskeleton use is prolonged.

In view of the foregoing, a need exists for an improved exomuscle system and method in an effort to overcome the aforementioned obstacles and deficiencies of conventional exoskeleton systems.

BRIEF DESCRIPTION OF THE DRAWINGS

FIG. 5a is a cross-sectional drawing of an embodiment of an anterior-knee actuator positioned on the knee of a user.

FIG. 5b is another cross-sectional drawing of the anterior-knee actuator positioned on the knee of a user as shown in FIG. 5a.

FIG. 5c is a further cross-sectional drawing of the anterior-knee actuator positioned on the knee of a user as shown in FIG. 5a.

FIG. 6a is a cross-sectional drawing of an embodiment of an elbow actuator positioned on the elbow of a user, wherein the actuator is deflated.

FIG. 6b is a cross-sectional drawing of the elbow actuator of FIG. 6a, wherein the actuator is inflated.

FIG. 7 is a perspective drawing of an embodiment of a shoulder actuator positioned on the shoulder of a user.

FIG. 9 is a cross-sectional drawing of another embodiment of an elbow actuator.

FIG. 10a is an exemplary front-view of an exomuscle leg-unit worn by a user and illustrating another embodiment of a pneumatic exomuscle system.

FIG. 10b is an exemplary close-up front-view of the exomuscle leg-unit of FIG. 10a.

FIG. 11 is an exemplary side-view of the exomuscle leg-unit of FIGS. 10a and 10b, wherein the user's leg is bent.

Figure 1:
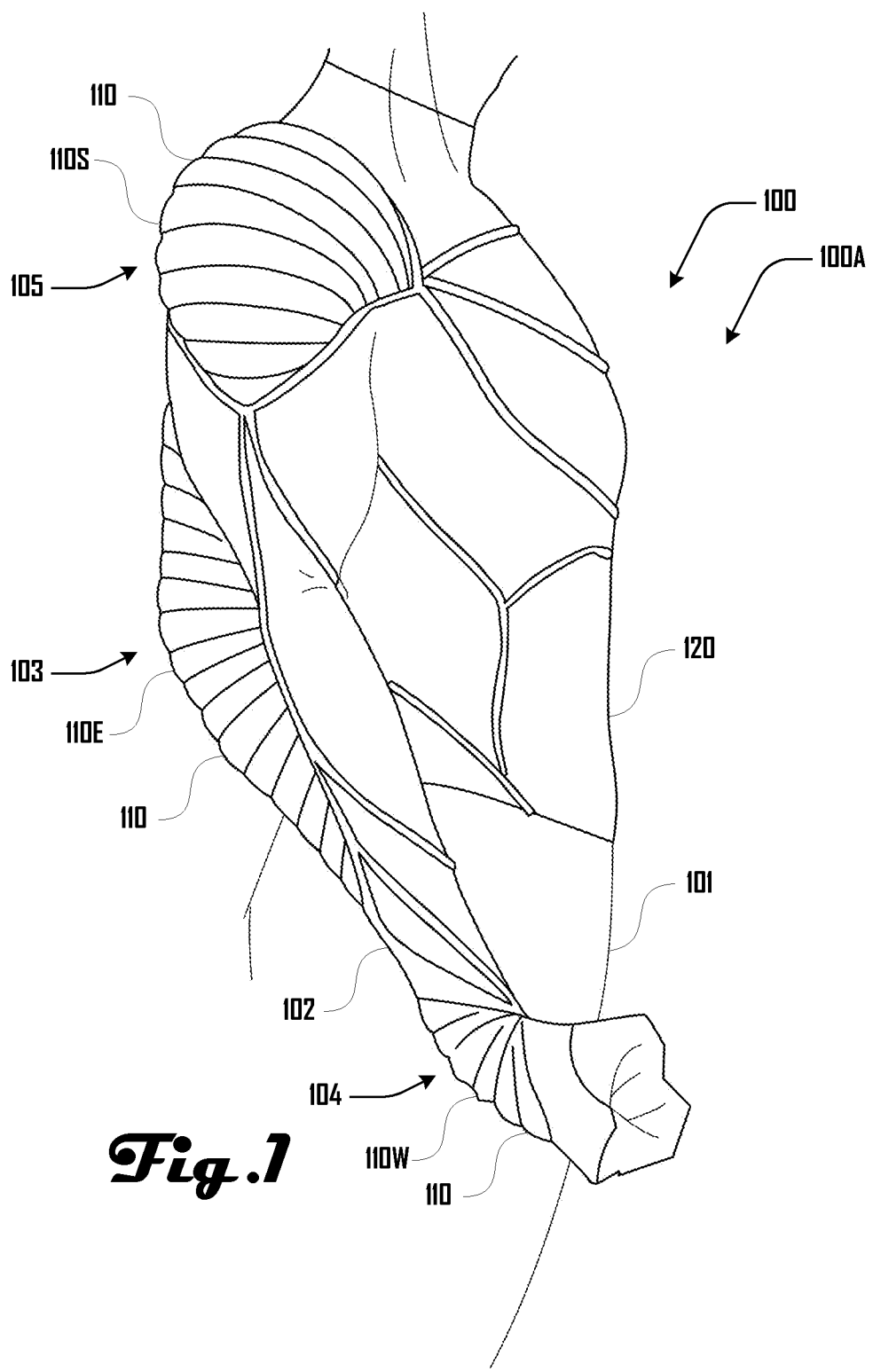
FIG. 1 is an exemplary side view of an exomuscle top-suit being worn by a user and illustrating an embodiment of a pneumatic exomuscle system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available powered exoskeleton systems are deficient, an exomuscle system that provides lightweight and ergonomic actuation of the body can prove desirable and provide a basis for a wide range of applications, such as a system that is wearable under conventional clothing, a system that is soft and pliable, a system that provides for the complex translational and rotational movements of the human body, and/or a system that can be worn comfortably while in use and while not in use. This result can be achieved, according to one embodiment disclosed herein, by an exomuscle system 100 as illustrated in FIG. 1.

Turning to FIG. 1, one embodiment 100A of a pneumatic exomuscle system 100 is shown as comprising a plurality of actuators 110 disposed at locations of a shirt 120 that is being word by a user 101. A shoulder-actuator 110S is shown positioned over the shoulder 105 of the user 101. An elbow-actuator 110E is shown positioned over the elbow 103 of the user 101. A wrist-actuator 110W is shown positioned over the wrist 104 of the user 101.

Figure 2:
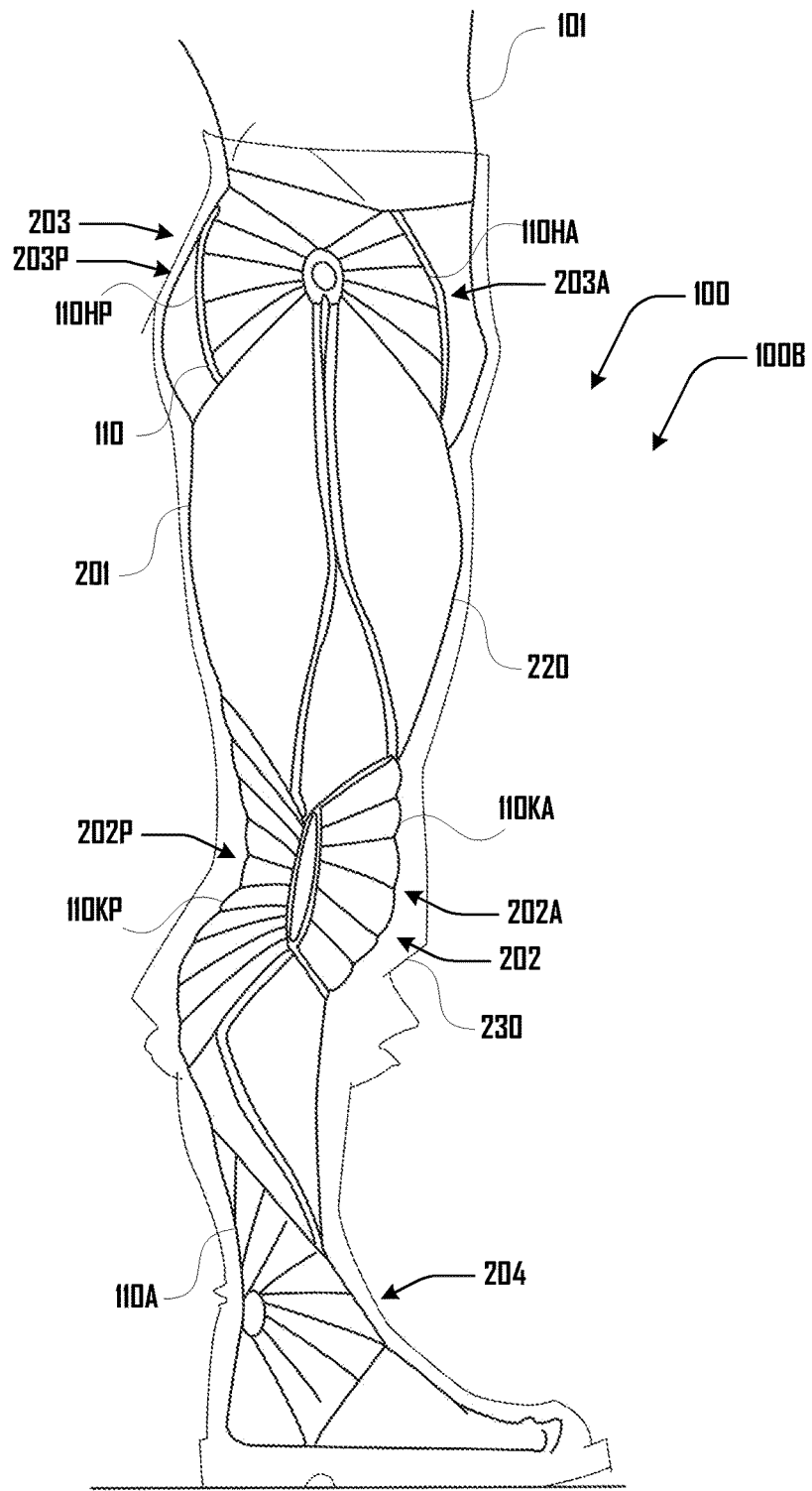
FIG. 2 is an exemplary side view of an exomuscle leg-suit worn by a user and illustrating another embodiment of a pneumatic exomuscle system.

Similarly, FIG. 2 illustrates another embodiment 100B of a pneumatic exomuscle system 100 that is shown comprising a plurality of actuators 110 disposed at locations on leggings 220 that are being worn on the legs 201 of a user 101. An anterior knee-actuator 110KA and posterior knee-actuator 110KP are shown positioned on respective anterior 202A and posterior 202P sides of the knee 202 of the user 101. An anterior hip-actuator 110HA and posterior hip-actuator 110HP are shown positioned on respective anterior 203A and posterior 203P sides of the hip 203 of the user 101.

Although FIGS. 1 and 2 illustrate separate top and bottom suits 100A, 100B, in various embodiments the pneumatic exomuscle system 100 can be configured to cover the entire body of a user 101 or portions of the body a user 101. For example, the pneumatic exomuscle system 100 can be embodied in a complete body suit, an arm sleeve, a leg sleeve, a glove, a sock, or the like. Additionally, although actuators 110 are depicted being positioned over the elbow 103, wrist 104, shoulder 105, knee 202, hip 203 and ankle 204, any one or more of these actuators 110 can be absent and/or additional actuators 110 can be present in any other suitable location. For example, actuators 110 can be present on hands, feet, neck, torso, or the like.

Furthermore, the present disclosure discusses various embodiments of the pneumatic exomuscle system 100 being worn by a human user 101, but in further embodiments, the pneumatic exomuscle system 100 can be adapted for use by non-human users (e.g., animals) or adapted for non-living devices such as robots or the like. For example, one embodiment includes the use of the pneumatic exomuscle system 100 and/or one or more actuator 110 in a robotic arm not worn on the body 101, which is also known as a robotic manipulator.

Figure 3A:
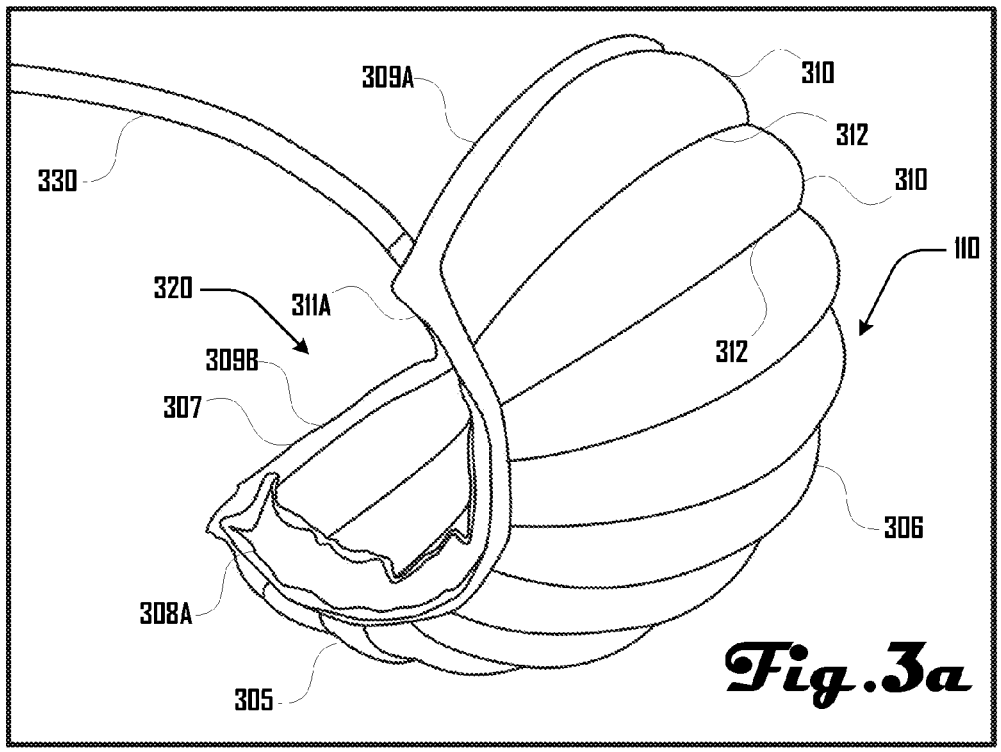
FIG. 3a is an exemplary perspective drawing illustrating an embodiment of an actuator, where the actuator is inflated.
Figure 3B:
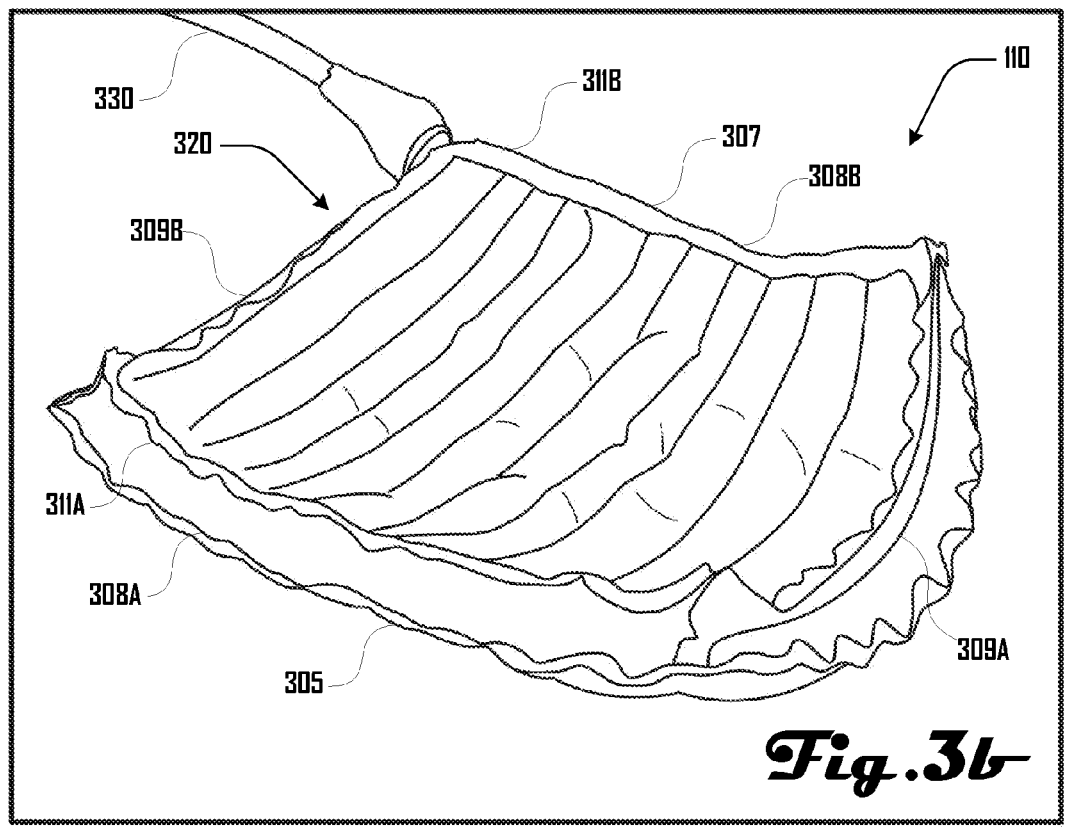
FIG. 3b is an exemplary perspective drawing illustrating the actuator of FIG. 3a, where the actuator is deflated.

FIGS. 3a and 3b are exemplary perspective drawings illustrating an embodiment of an actuator 110 in an inflated state (FIG. 3a) and deflated state (FIG. 3b). The actuator 110 comprises a body 305 having side edges 308A, 308B; top and bottom ends 309A, 309B; and an external face 306 and internal face 307. The body 305 is defined by an array of chambers 310 that extend between the sides 308A, 308B. The chambers 310 are coupled together at a plurality of seams 312 between respective chambers 310, and the seams 312 can also separate an internal cavity (not shown in FIG. 3a or 3b) of each chamber 310.

In various embodiments the chambers 310 can be selectively inflated and deflated to change the shape of the actuator 110. For example, as shown in FIG. 3a, the chambers can be inflated with a fluid, which can cause the actuator 110 to curl inward to deepen an internal cavity 320 defined by the internal face 307 of the body 305. In contrast, as illustrated in FIG. 3b, when the actuator 110 is deflated, the actuator 110 can assume a flatter configuration compared to the curled configuration when the actuator 110 is inflated as shown in FIG. 3a. Accordingly, as shown in FIG. 3b, the cavity 320 can be more shallow when the actuator 110 is deflated compared to the deeper cavity 320 generated when the actuator is inflated as illustrated in FIG. 3a.

In various embodiments, fluid can be introduced and/or exit from the chambers 310 of the actuator 110 via one or more pneumatic line 330. In some embodiments, an actuator 110 can be configured to inflate and/or deflate as a unit (e.g., all chambers 310 of the actuator 110 inflate and/or deflate in concert. However, in some embodiments, chambers 310 can be controlled individually and/or as a group.

Figure 4A:
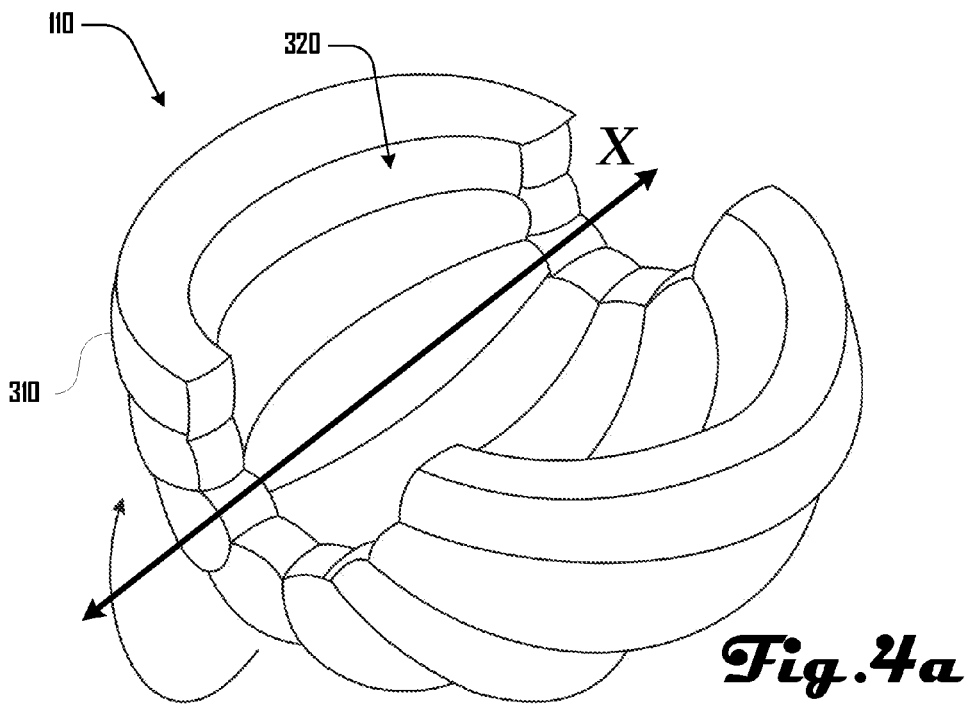
FIG. 4a is an exemplary perspective drawing illustrating another embodiment of an actuator, where the actuator is inflated.
Figure 4B:
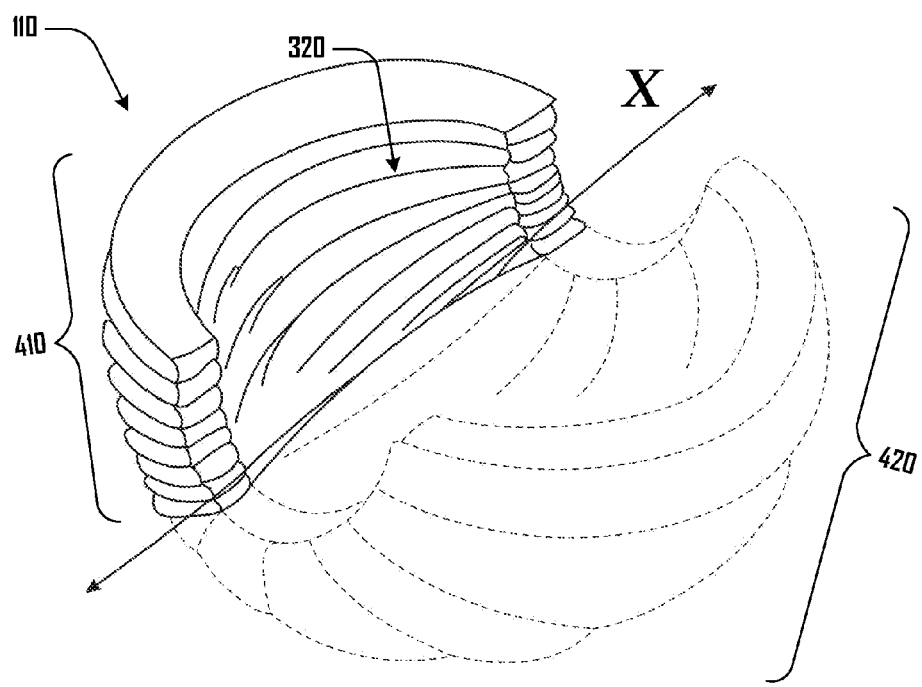
FIG. 4b is an exemplary perspective drawing illustrating the actuator of FIG. 4a, where a portion of the actuator is deflated.

For example, as illustrated in FIGS. 4a and 4b different groups of chambers 310 can be selectively inflated or deflated. As shown in FIG. 4a, the chambers 310 of the actuator 110 can be inflated and expand about axis X to define cavity 320. However, as shown in FIG. 4b, a first portion 410 of the actuator 110 can be deflated (shown in continuous lines), whereas a second portion 420 of the actuator can remain inflated (shown in dashed lines). In various embodiments, groups and/or individual chambers 310 of an actuator 110 can be inflated and/or deflated in any suitable pattern or configuration. For example, although FIG. 4b shows the first deflated portion 410 of the actuator being a set of chambers 310 that are contiguously grouped together, in some embodiments, non-contiguous chambers 310 can be inflated and/or deflated as a group. In one example, every odd chamber 310 can be inflated with every even chamber 310 being deflated.

In one preferred embodiment, the actuators 110 can be inflated with air; however, in further embodiments, any suitable fluid can be used to inflate the chambers 310. For example, gasses including oxygen, helium, nitrogen, and/or argon, or the like can be used to inflate and/or deflate the chambers 310. In further embodiments, a liquid such as water, an oil, or the like can be used to inflate the chambers 310.

Actuators 110 can be made of any suitable material. For example, in some embodiments, actuators 110 can comprise a flexible sheet material such as woven nylon, rubber, polychloroprene, a plastic, latex, a fabric, or the like. In some embodiments, bladders can be disposed within the chambers 310 and/or the chambers 310 can comprise a material that is capable of holding a desired fluid. The actuators 110 can comprise a flexible, elastic or deformable material that is operable to expand and contract when the chambers 310 are inflated or deflated as described herein. In some embodiments, the actuators 110 can be biased toward a deflated configuration such that the actuator 110 is elastic and tends to return to the deflated configuration when not inflated. Additionally, although actuators 110 shown herein are configured to expand and/or extend when inflated with fluid, in some embodiments, actuators 110 can be configured to shorten and/or retract when inflated with fluid.

In various embodiments, actuators can be configured to surround a joint of a user 101 and have an axis of rotation that is coincident with the axis of rotation of the joint. For example, FIG. 5a is a cross-section illustration of a leg 201 of a user 101, which has an anterior knee-actuator 110KA positioned over the knee 202 of the user. As shown in the cross-section, the knee joint 510 is defined by the junction of the femur 502 and tibia 503, which provides an axis of rotation 510 for the knee joint 202.

In various embodiments, it can be beneficial to have the actuator 110KA inflate and curl about an axis that is coincident with the axis of rotation 510 of the knee joint 202. For example, as shown in FIG. 5a, each of the seams 312 that define the boundaries can have an axis R that intersects the axis of the other seams 312 substantially at the axis of rotation 510 for the knee joint 202. In other words, the actuator 110KA includes a plurality of chambers 310 that are coupled to each other via a plurality of respective seams 312, which define an axis of rotation that is coincident the axis of rotation 510 for the knee joint 202. For example, chamber $310_1$ is bounded by seams $312_1$ and $312_2$, which have respective axes $R_1$ and $R_2$. Similarly, chamber $310_2$ is bounded by seams $312_2$ and $312_3$, which have respective axes $R_2$ and $R_3$. In this example, axes $R_1$, $R_2$ and $R_3$ intersect at the axis of rotation 510 for the knee joint 202.

In various embodiments, axes R can be defined by a plane of material, or the like that defines the seam 312. In further embodiments, the material of the seam 312 need not be coincident with such as axis R, and such an axis R can be defined by movement and/or expansion characteristics of the actuator 110.

Similarly, FIGS. 6a and 6b illustrate a cross-section of an elbow-actuator 110E positioned over an elbow 103 of a user 101. The elbow joint 103 includes the humerus 601 that extends from the shoulder 105 (shown in FIG. 1), which couples with the ulna 603 and radius (not shown in FIG. 6a or 6b) to define an axis of rotation 610. Much like the anterior knee actuator 110KA discussed above, the elbow-actuator 110E includes a plurality of chambers 310 that are coupled to each other via a plurality of respective seams 312, which define an axis of rotation that is coincident with the axis of rotation 610 for the elbow joint 103. For example, chamber $310_1$ is bounded by seams $312_1$ and $312_2$, which have respective axes $R_1$ and $R_2$. Similarly, chamber $310_2$ is bounded by seams $312_2$ and $312_3$, which have respective axes $R_2$ and $R_3$. In this example, axes $R_1$, $R_2$ and $R_3$ intersect at the axis of rotation 510 for the knee joint 202.

FIG. 6a illustrates the elbow-actuator 110E in a deflated configuration P1 and FIG. 6b illustrates the elbow-actuator 110E in an inflated configuration P2. In the deflated configuration P1 the arm 102 is straight, whereas the arm 102 is bent in the inflated configuration P2. However, as shown in FIGS. 6a and 6b the axis of rotation of the elbow-actuator 110E remains coincident with the axis of rotation 610 of the elbow joint 103 of the arm 102. This can be beneficial in various embodiments because having a coincident axis of rotation 610 can result in more natural movement that is not stressful on the joint 103 as the elbow-actuator 110E actuates the arm 102. FIG. 9 illustrates an alternative embodiment of an elbow actuator 110E.

Additionally, in some embodiments, the example actuators 110 illustrated in FIGS. 3a, 3b, 4a, 4b, can provide for both translational and rotational movement of the human body 101. Furthermore, in various embodiments, forces between the body 101 and the system 100 can be spread out over a greater surface area (e.g., a plurality of actuators 110, and the like), which allows more work to be done by the exomuscle system 100 compared to other systems with less surface area contact between the system and user 101.

As discussed above, the example actuators 110 illustrated in FIGS. 3a, 3b, 4a, 4b, can be adapted to various body joints in addition to the knee 202 and elbow 103. Such actuators 110 can also be adapted to be positioned on the front and/or back (anterior and/or posterior) of various body joints to provide for flexion and/or extension, abduction and/or adduction, or the like. In some embodiments, actuators 110 can be configured to be single-direction actuators 110 and actuators 110 can be position antagonistically. For example, as shown in FIG. 1, the anterior knee-actuator 110KA can be antagonistic to the posterior knee-actuator 110KP such that the leg 201 flexes from an extended configuration to a bent configuration where the anterior knee-actuator 110KA expands to antagonistically compress the posterior knee-actuator 110KP. Similarly, the leg 201 can extend from a bent configuration to a straight configuration where the posterior knee-actuator 110KP expands to antagonistically compress the anterior knee-actuator 110KA. Accordingly, in various embodiments, the example actuators 110 illustrated in FIGS. 3a, 3b, 4a, 4b, can be beneficial for actuating joints with one degree of freedom.

Figure 8A:
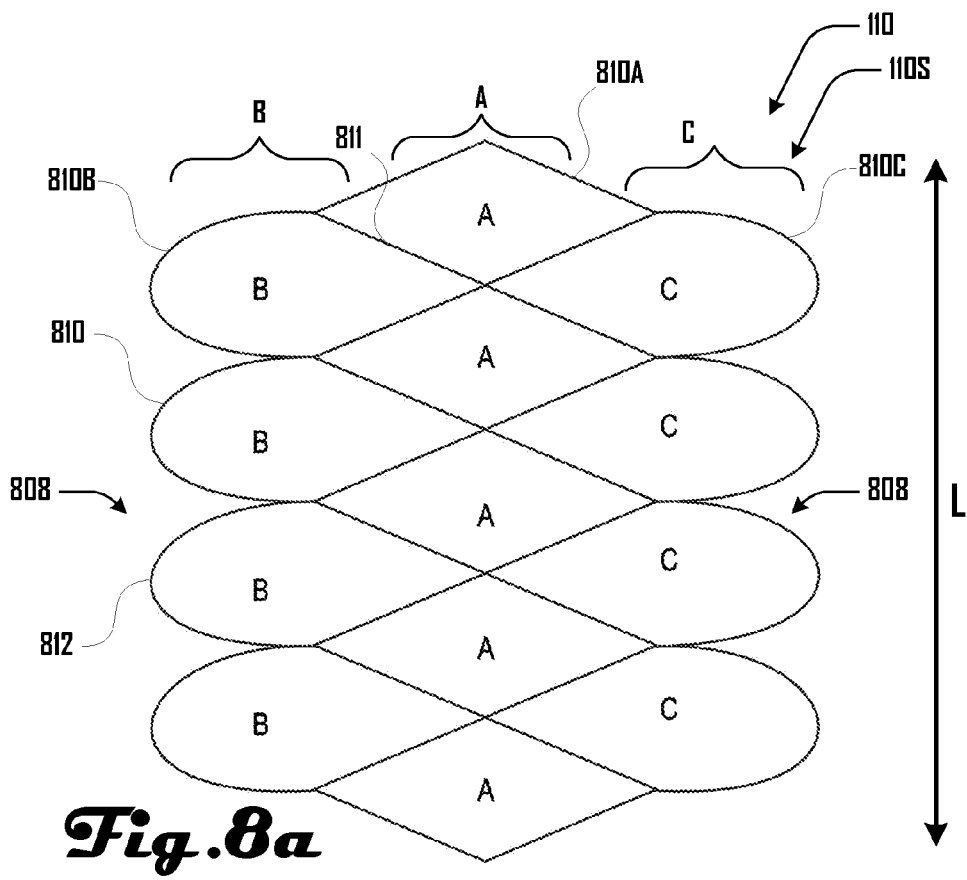
FIG. 8a is an exemplary perspective drawing illustrating another embodiment of the shoulder actuator of FIG. 7.
Figure 8B:
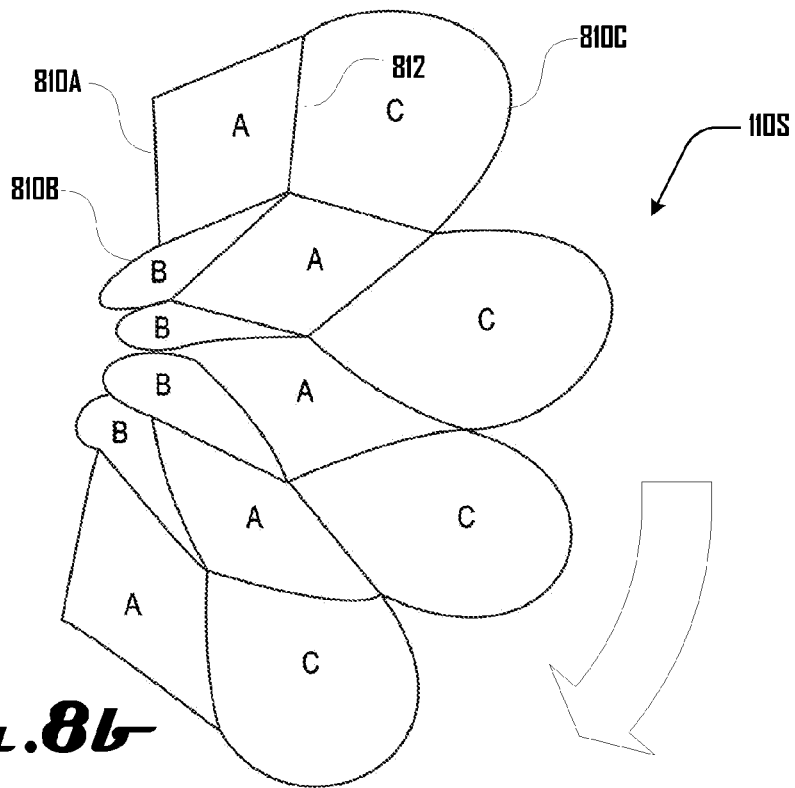
FIG. 8b is an exemplary perspective drawing illustrating the actuator of FIGS. 7 and 8a, where a portion of the actuator is deflated and a portion is inflated.

In contrast, FIG. 7 illustrates an example of another embodiment of an actuator 110 positioned on the shoulder 105 of a user 101. Such an embodiment of a shoulder-actuator 1105 can be configured to provide at least two degrees of freedom to the arm 102 of the user 101. For example, as shown in FIGS. 7, 8a and 8b the shoulder-actuator 1105 can include three columns of chambers 810 (labeled A, B and C respectively). In the example shoulder-actuator 1105 of FIGS. 7, 8a and 8b, a central column A of chambers 810A is disposed between outer columns B, C of chambers 810B, 810C. The central column A is shown as comprising a linear stack of diamond-shaped chambers 810A, with outer chambers 810B, 810C being interleaved between chambers 810A of the central column A. Outer chambers 810B, 810C are shown having an angular portion 811 that corresponds to the diamond-shaped central chambers 810A, and a rounded portion 812 that defines respective edges 808 of the actuator 110.

In various embodiments, each of the columns A, B, C can be independently controlled. In other words, each of the columns A, B, C can be separately and selectively inflated and/or deflated. For example, FIG. 8b illustrates a configuration of the shoulder-actuator 1105, wherein the B-column is deflated, and the C-column is inflated. In such a configuration, the shoulder-actuator 1105 bends inward toward deflated B-column, which would accordingly move the shoulder 105 and arm 102 in this direction.

Similarly, if the B-column is inflated, and the C-column is deflated, (not illustrated) the shoulder-actuator 1105 would bend inward toward deflated C-column, which would accordingly move the shoulder 105 and arm 102 in this direction. Accordingly, by selectively inflating and/or deflating the outer columns B, C. The shoulder-actuator 1105 can move a shoulder 105 and arm 102 from side-to-side in various embodiments (i.e., flexion and extension).

Additionally, the shoulder-actuator 1105 can provide for moving the arm 105 up and down (i.e., abduction and adduction). For example, where the A-column is deflated the length L (shown in FIG. 8a) of the shoulder-actuator 1105 is shortened and where the A-column is inflated the length L of the shoulder-actuator 1105 is increased. Accordingly, deflation of the center-column A, can cause raising of the arm 102 (i.e., abduction) and inflation of the center-column A, can cause lowering of the arm 102.

Therefore, by varying the inflation and/or deflation of the columns A, B, C, the shoulder-actuator 1105 can generate motion of the arm 102 about the shoulder 105 that mimics natural shoulder motions of a user 101. For example, the table below illustrates some example, arm configurations that can be generated by different inflation/deflation configurations of the shoulder-actuator 1105 in accordance with some embodiments.

| Column A State | Column B State | Column C State | Arm State |
| --- | --- | --- | --- |
| Deflated | Deflated | Deflated | Raised, At Median |
| Deflated | Inflated | Deflated | Raised, Toward Anterior |
| Deflated | Deflated | Inflated | Raised, Toward Posterior |
| Inflated | Inflated | Inflated | Lowered, At Median |
| Inflated | Inflated | Deflated | Lowered, Toward Anterior |
| Inflated | Deflated | Inflated | Lowered, Toward Posterior |

Accordingly, in various embodiments, the example shoulder-actuator 1105 can mimic the deltoid muscles of a shoulder 105. For example, in some embodiments, the B-column can be analogous to the posterior deltoid, the A-column can be analogous to the lateral deltoid, and the C-column can be analogous to the anterior deltoid.

Although one example embodiment of a shoulder-actuator 1105 is disclosed in FIGS. 7, 8a and 8b, this example embodiment should not be construed to be limiting on the numerous variations and alternative embodiments that are within the scope and spirit of the present invention. For example, in some embodiments, there can be any suitable plurality of columns, including less than three or more than three. Additionally, the shape, size and proportions of the chambers 810 can be any suitable configuration and can be regular or irregular. For example, in one embodiment, the size of the chambers decreases from the top end to the bottom end.

In some embodiments, an exomuscle system 100 can comprise structural supportive elements. For example, FIGS. 10a, 10b and 11 illustrate an embodiment 100C of an exomuscle system 100 that comprises an anterior knee actuator 110KA, posterior knee-actuator 110KP (shown in FIG. 11) with a plurality of upper supports 1010 that extend from and above the knee-actuators 110KA, 110KP, and a plurality of lower supports 1020 extending from and below the knee-actuators 110KA, 110KP. The lower supports 1020 are secured to the ankle 204 of the user 101 via a strap 1030 (shown in FIG. 11).

In various embodiments, the upper and lower supports 1010, 1020 are configured to be anisotropic support structures that carry a body load in the axial direction, while also providing for torsional movement. In other words, the supports 1010, 1020 are configured to be stiff and supportive in a vertical direction while also allowing turning and bending of the leg 102. For example, as shown in FIG. 11, the user 101 is able to bend his knee 202 while the supports 1010, 1020 also provide vertical support when the leg 102 is in a straight configuration. This may be beneficial because axial support provided by the supports 1010, 1020 provides load-bearing to the user 101 while walking or standing, while also allowing for the bending and rotating of the legs during walking or kneeling (as shown in FIG. 11).

In some embodiments, the supports 1010, 1020 can comprise fluid filled or inflated cavities. In further embodiments, the supports can comprise any suitable ridged, flexible, or deformable material. The supports 1010, 1020 can be statically or dynamically inflated in some embodiments. Additionally, while example supports 1010, 1020 are shown being associated with an exomuscle system 100 associated with the legs 102 of a user 101, in further embodiments, supports or similar structures can be configured to be associated with other parts of user body 101, including the arms 102 (See FIG. 1), elbow 103, wrist 104, shoulder 105, or the like.

Supports, and the like, can provide for various applications of an exomuscle system 100, including transferring loads to the ground and relieving such a burden on the user 101. For example, for a user 101 with a weak or disabled muscular system, the load of the user's body 101 can be transferred to supports of the exomuscle system 100. In another example, where a user 101 is carrying a load in his arms 102, in a backpack, or the like, such a load can be transferred to supports of the exomuscle system 100 to reduce the burden on the user 101. Such load transfer and burden reduction can be beneficial in extending the working endurance and capacity of disabled, partially-abled, less-abled, and fully-abled users 101.

For example, in one embodiment, a soldier carrying supplies can walk for an extended period of time and over a greater distance if the load of the supplies is transferred to an exomuscle system 100. Similarly, a warehouse worker can have greater endurance moving boxes, or the like, if such a load is transferred to an exomuscle system 100.

Figure 12:
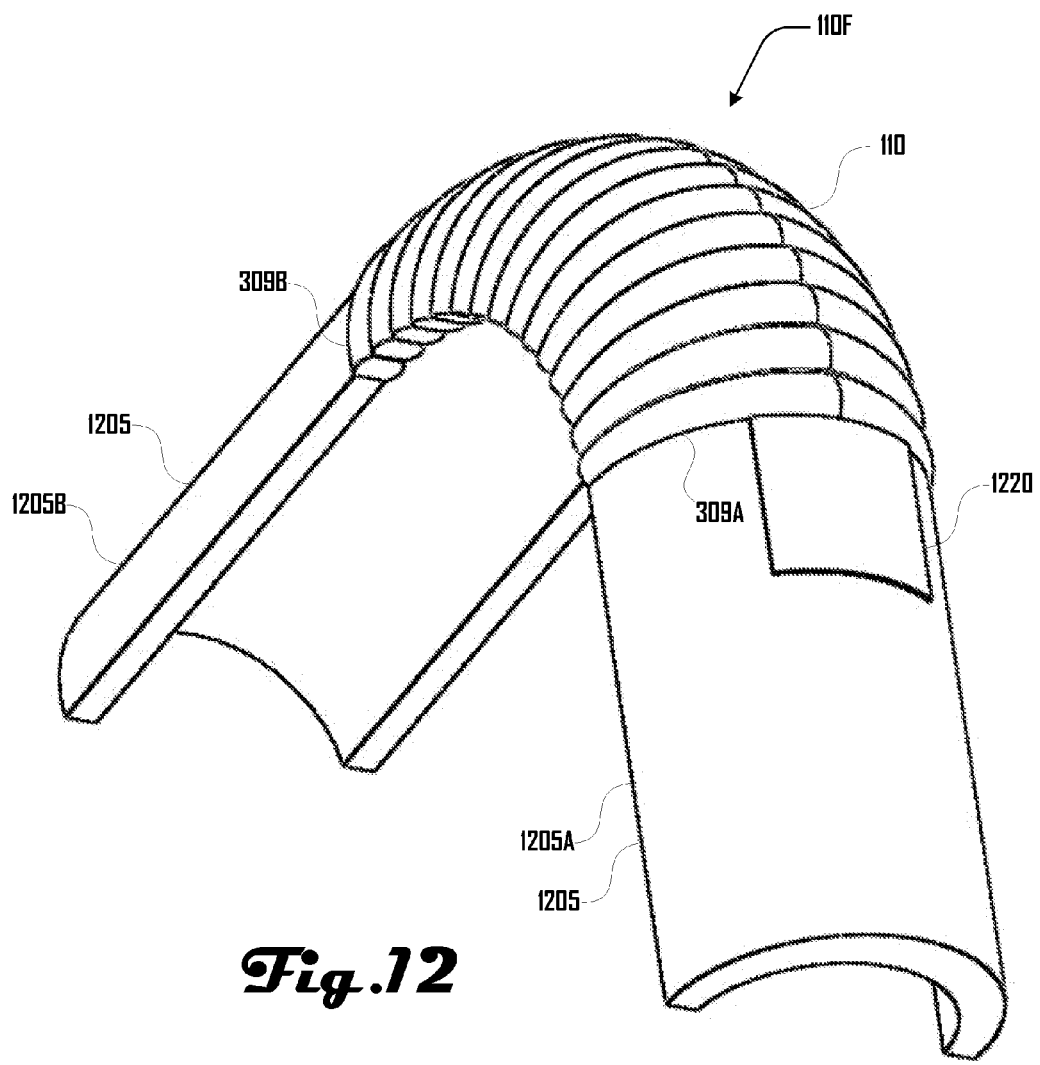
FIG. 12 is an exemplary perspective view of another embodiment of an actuator that comprises a reinforcing structure.

Turning to FIG. 12, in a further embodiment 110F, an actuator 110 can comprise one or more reinforcing structure 1220. In various embodiments, it can be beneficial to design an actuator 110 such that it uses anisotropic material selections to reinforce the actuator 110 against various types of failure modes. For example, as illustrated in FIG. 12 the actuator 110 includes a reinforcing structure 1220 that is coupled on and extends from a first end 309A of the actuator 110 and over a load transfer segment 1205A that also extends from the first end 309A.

In various embodiments, one or more reinforcing structure 1220 can provide resistance to buckling of the actuator 110 as the actuator 110 is inflated and/or deflated. For example, in the embodiment 110F of FIG. 12, the inflatable/deflateable portion 110 is sufficiently strong as it has curvature in two axes, but a load transfer segment 1205 is not able to provide two axes of curvature as it lies along a body segment of the user 101 such as the thigh, or the like. In this case, a reinforcement structure 1220 can be placed at the interface of the actuator 110 and the load transfer segments 1205A, 1205B to resist the concentrated buckling moments transferred by the actuator 110. Reinforcing structures 1220 can comprise any suitable material, including a rigid material such as plastic, metal, or the like. In some embodiments, the reinforcing structures 1220 need only be more rigid than the actuator 110 in at least one axis.

In various embodiments, a reinforcing structure 1220 can be designed to allow for compliance in all axes other than the axis of buckling that the reinforcement is trying to reinforce. For example, in the embodiment 110F of FIG. 12, reinforcing structure 1220 can be compliant towards moments along the length wise axis but stiff to buckling moments along the axis of rotation. In other embodiments, a reinforcing structure 1220 can be designed to stiffen the actuator portion 110 to avoid deformations such as resistance to a catastrophic buckling mode that may be present in the center of long actuators 110 or cyclic planar deformations that may be present in actuators 110 that are lacking sufficient attachment points to the human operator 101.

Additionally, although the reinforcing structure 1220 is shown as being a flat curved rectangular piece that extends from an end 309A of the actuator 110, in further embodiments, a reinforcing structure 1220 can comprise rib structures on a portion of the actuation 110, a reinforcing structure that extens lengthwise about and/or from the actuator 110, or the like.

Figure 13A:
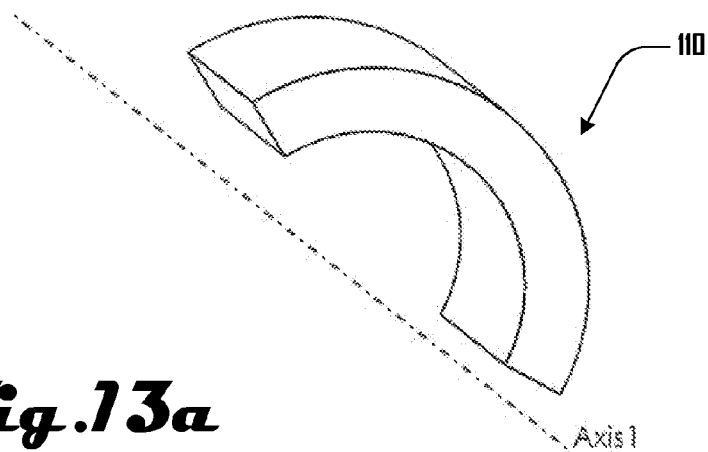
FIGS. 13a, 13b, 14a and 14b are perspective views of embodiments of actuators that include two or three dimensional shapes to provide resistance to buckling in undesired manners when the actuator is exposed to a load.
Figure 13B:
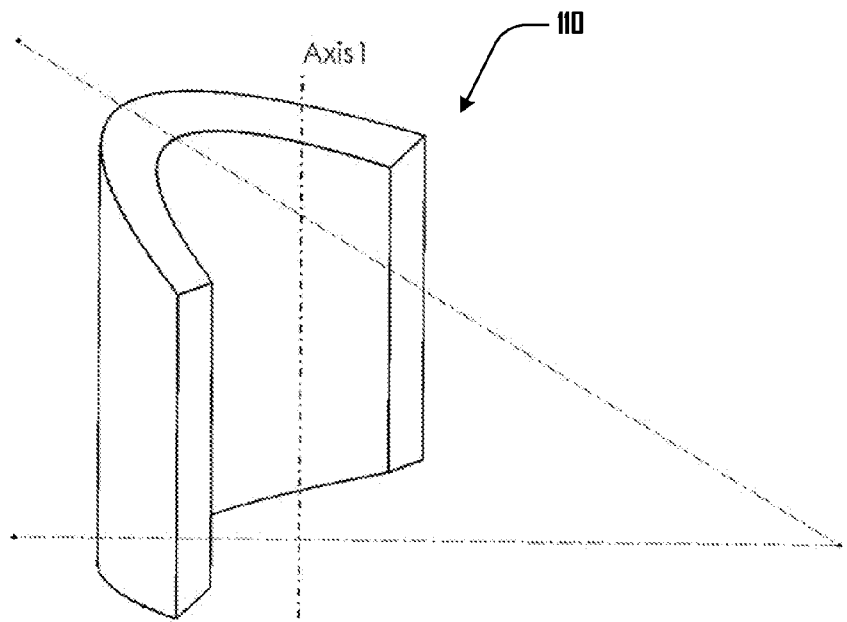
Figure 14A:
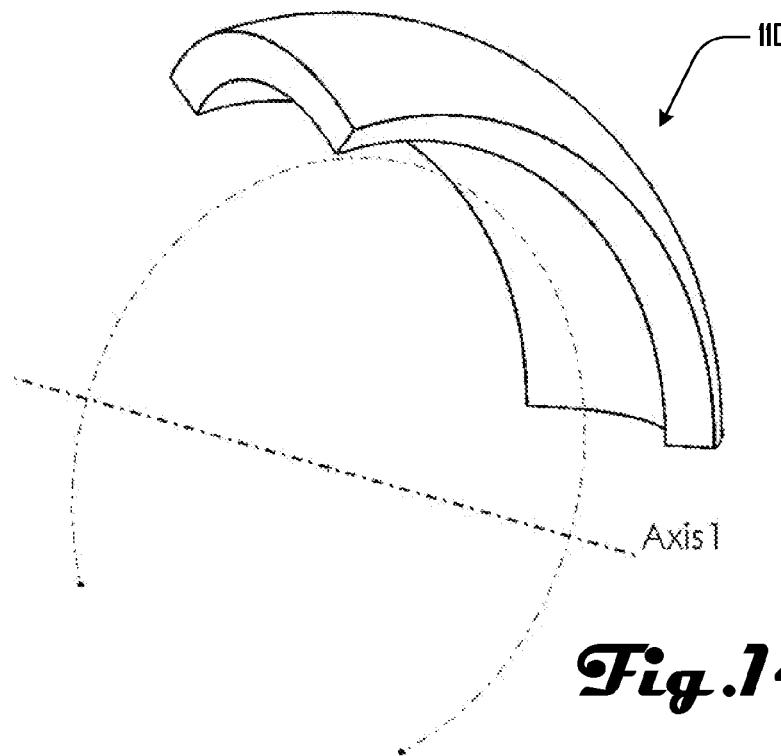
Figure 14B:
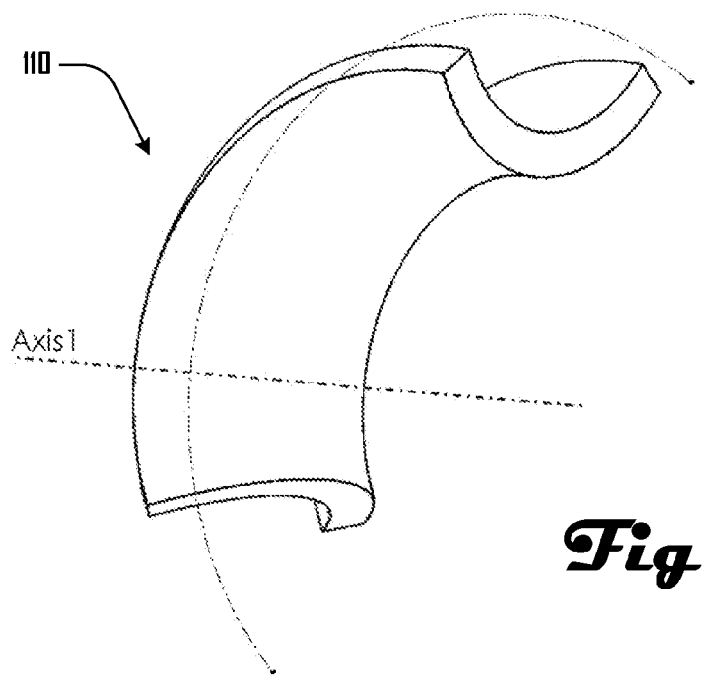

Turning to FIGS. 13a, 13b, 14a and 14b, in further embodiments it can be beneficial to design an actuator 110 such that it uses various two or three dimensional shapes to provide resistance to buckling in undesired manners when the actuator 110 is exposed to a load. One embodiment can introduce a single axis of curvature to the surface structure of the actuator such that the axis of curvature is aligned with the axis of rotation of the actuator as shown in FIG. 13a. Similarly, another embodiment can introduce a single axis of curvature to the surface structure such that the axis of curvature is not aligned with the axis of rotation as shown in FIG. 13b. A further embodiment introduces additional axes of curvature to further strengthen the actuator towards unintended buckling by including two axes of curvature that lie on the same side of the actuator body as shown in FIG. 14a. A specific instance of this embodiment can include two axes of rotation intersecting with the same radius of curvature, such that the actuator 110 forms the surface segment of a sphere. Yet another embodiment of the invention includes additional axes of curvature to the surface of the fabric structure that do not lie on the same side of the actuator. A specific instance of this embodiment involves the two axes being perpendicular to each other thereby creating a saddle structure with the surface of the actuator as shown in FIG. 14b.

Figure 15:
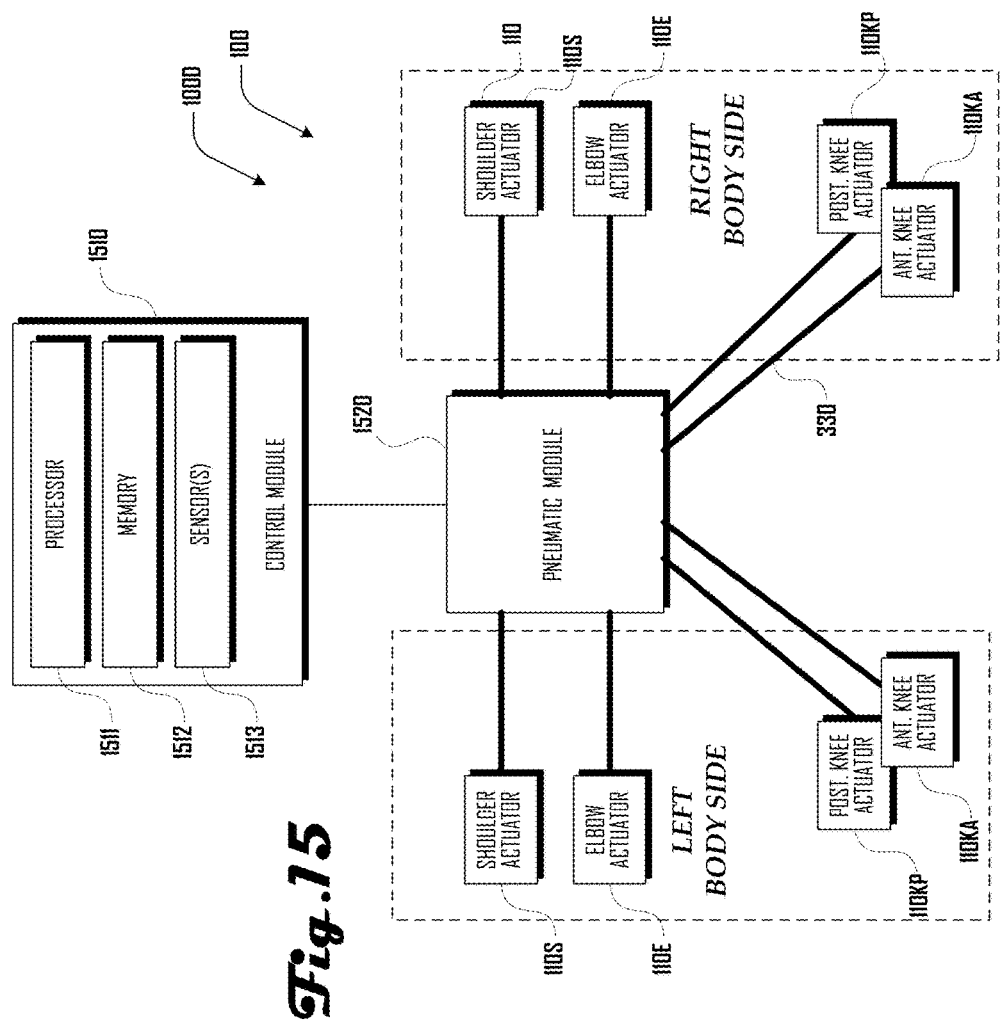
FIG. 15 is a block diagram of an embodiment of an exomuscle system that includes a control module that is operably connected to a pneumatic module.

FIG. 15 is a block diagram of an embodiment 100D of an exomuscle system 100 that includes a control module 1510 that is operably connected to a pneumatic module 1520. The control module 1510 comprises a processor 1511, a memory 1512, and at least one sensor 1513. A plurality of actuators 110 are operably coupled to the pneumatic module 1520 via respective pneumatic lines 330. The plurality of actuators 110 include pairs of shoulder-actuators 1105, elbow-actuators 110E, anterior knee-actuators 110KA, and posterior knee-actuators 110KP that are positioned on the right and left side of a body 101. For example, as discussed above, the example exomuscle system 100D shown in FIG. 15 can be part of top and/or bottom suits 100A, 100B (shown in FIGS. 1 and 2), with the actuators 110 positioned on respective parts of the body 101 as discussed herein. For example, the shoulder-actuators 1105 can be positioned on left and right shoulders 105; elbow-actuators 110E can be positioned on left and right elbows 103; and anterior and posterior knee-actuators 110KA, 110KP can be positioned on the knee anterior and posterior 202A, 202P.

In various embodiments, the example system 100D can be configured to move and/or enhance movement of the user 101 wearing the exomuscle system 100D. For example, the control module 1510 can provide instructions to the pneumatic module 1520, which can selectively inflate and/or deflate the actuators 110. Such selective inflation and/or deflation of the actuators 110 can move the body to generate and/or augment body motions such as walking, running, jumping, climbing, lifting, throwing, squatting, or the like.

In some embodiments, such movements can be controlled and/or programmed by the user 101 that is wearing the exomuscle system 100D or by another person. Movements can be controlled in real-time by a controller, joystick or thought control. Additionally, various movements can be prepreprogrammed and selectively triggered (e.g., walk forward, sit, crouch) instead of being completely controlled. In some embodiments, movements can be controlled by generalized instructions (e.g. walk from point A to point B, pick up box from shelf A and move to shelf B).

In further embodiments, the exomuscle system 100D can be controlled by movement of the use 101. For example, the control module 1510 can sense that the user 101 is walking and carrying a load and can provided a powered assist to the user 101 via the actuators 110 to reduce the exertion associated with the load and walking. Accordingly, in various embodiments, the exomuscle system 100D can react automatically without direct user interaction.

In some embodiments the sensors 1513 can include any suitable type of sensor, and the sensors 1513 can be located at a central location or can be distributed about the exomuscle system 100D. For example, in some embodiments, the system 100D can comprise a plurality of accelerometers, force sensors, position sensors, and the like, at various suitable positions, including at the actuators 110 or any other body location. In some embodiments, the system 100D can include a global positioning system (GPS), camera, range sensing system, environmental sensors, or the like.

The pneumatic module 1520 can comprise any suitable device or system that is operable to inflate and/or deflate the actuators 110. For example, in one embodiment, the pneumatic module can comprise a diaphragm compressor as disclosed in copending related patent application Ser. No. 14/577,817 filed Dec. 19, 2014, which claims the benefit of U.S. Provisional Application No. 61/918,578, filed Dec. 19, 2013.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A pneumatic exomuscle system comprising:
   a pneumatic module;
   a plurality of pneumatic actuators each operably coupled to the pneumatic module via at least one pneumatic line, a portion of the pneumatic actuators configured to be worn about respective body joints of a user with at least one pneumatic actuator comprising a plurality of elongated inflatable chambers stacked lengthwise along a first axis in an array from a top-end to a bottom-end, the length of the plurality of elongated inflatable chambers defining the first axis, the array configured to couple about a limb of a user at the joint of the limb, the limb extending along a second axis perpendicular to the first axis when the limb is in a straightened configuration;
   a control module operably coupled to the pneumatic module, the control module configured to control the pneumatic module to selectively inflate portions of the pneumatic actuators; and
   wherein a pneumatic actuator comprises a reinforcing structure configured to resist a concentrated buckling moment transferred by the pneumatic actuator during movement of the pneumatic actuator.

2. The pneumatic exomuscle system of claim 1, wherein the pneumatic actuators are disposed on at least one of a top-suit portion and bottom-suit portion configured to be worn by the user.

3. The pneumatic exomuscle system of claim 2, wherein pneumatic actuators are disposed on a top-suit portion such that pneumatic actuators are configured to be disposed over shoulders and anterior and posterior elbow regions when the top-suit portion is worn by the user.

4. The pneumatic exomuscle system of claim 2, wherein pneumatic actuators are disposed on a bottom-suit portion such that pneumatic actuators are configured to be disposed over anterior and posterior knee regions when the bottom-suit portion is worn by the user.

5. The pneumatic exomuscle system of claim 1, wherein a portion of the inflatable chambers are configured to be simultaneously inflated as a group; and
wherein said at least one pneumatic actuator is configured to curl inward about an internal face of the pneumatic actuator.

6. The pneumatic exomuscle system of claim 5, wherein said at least one pneumatic actuator is configured to curl about an axis that is coincident with the axis of rotation of a body joint, when said at least one pneumatic actuator is worn over the body joint.

7. The pneumatic exomuscle system of claim 1, wherein said pneumatic actuators comprise a woven fabric.

8. The pneumatic exomuscle system of claim 1, wherein the control module is configured to control the pneumatic module to selectively inflate portions of the pneumatic actuators to induce body movements in the user.

9. The pneumatic exomuscle system of claim 1, wherein the control module is configured to sense body movements of the user and control the pneumatic module to selectively inflate portions of the pneumatic actuators to support said body movements of the user.

10. A pneumatic exomuscle system comprising:
a pneumatic module;
a plurality of pneumatic actuators each operably coupled to the pneumatic module via at least one pneumatic line, a portion of the pneumatic actuators configured to be worn about respective body joints of a user with at least one pneumatic actuator comprising a plurality of elongated inflatable chambers stacked lengthwise along a first axis in an array from a top-end to a bottom-end, the length of the plurality of elongated inflatable chambers defining the first axis, the array configured to couple about a limb of a user at the joint of the limb, the limb extending along a second axis perpendicular to the first axis when the limb is in a straightened configuration;
a control module operably coupled to the pneumatic module, the control module configured to control the pneumatic module to selectively inflate portions of the pneumatic actuators, and
a plurality of anisotropic support structures configured to extend about the limb of the user and carry a load in a first direction, while providing for torsional movement in at least one second direction when worn by the user.

11. The pneumatic exomuscle system of claim 10, wherein the plurality of anisotropic support structures are operably connected to the pneumatic system via at least one pneumatic line.

12. A pneumatic exomuscle system comprising:
a pneumatic module;
a plurality of pneumatic actuators each operably coupled to the pneumatic module via at least one pneumatic line, a portion of the pneumatic actuators configured to be worn about respective body joints of a user with at least one pneumatic actuator comprising a plurality of elongated inflatable chambers stacked lengthwise along a first axis in an array from a top-end to a bottom-end, the length of the plurality of elongated inflatable chambers defining the first axis, the array configured to couple about a limb of a user at the joint of the limb, the limb extending along a second axis perpendicular to the first axis when the limb is in a straightened configuration;
a control module operably coupled to the pneumatic module, the control module configured to control the pneumatic module to selectively inflate portions of the pneumatic actuators,
wherein a pneumatic actuator defines a two or three dimensional shape configured to provide resistance to buckling of the pneumatic actuator during inflation of the pneumatic actuator.

13. A pneumatic actuator comprising:
a plurality of inflatable chambers stacked in an array from a top-end to a bottom end, the chambers defining a first, second and third column, with each column defined by a set of inflatable chambers that are configured to be selectively inflatable as a group, the first, second and third column defining a central column disposed and interleaved between a pair of outer columns, the pneumatic actuator configured to be worn on the shoulder of a user, and
wherein each column is separately selectively inflatable from the other columns.

14. The pneumatic actuator of claim 13, wherein the pneumatic actuator is disposed on a top-suit portion such that said at least one pneumatic actuator is disposed over the shoulder of a user when the top suit is worn by the user.

15. A pneumatic exomuscle system comprising:
a pneumatic module;
a plurality of pneumatic actuators each operably coupled to the pneumatic module via at least one pneumatic line, a portion of the pneumatic actuators configured to be worn about respective body joints of a user with at least one pneumatic actuator being the pneumatic actuator of claim 13; and
a control module operably coupled to the pneumatic module, the control module configured to control the pneumatic module to selectively inflate portions of the pneumatic actuators.

* * * * *